(12) United States Patent
MacBeath et al.

(10) Patent No.: US 8,043,606 B2
(45) Date of Patent: Oct. 25, 2011

(54) POLYMERIC COMPOSITIONS FOR SUSTAINED RELEASE OF VOLATILE MATERIALS

(75) Inventors: Calum MacBeath, Francavilla al mare (IT); Italo Corzani, Chieti (IT); Lamia Delphine Mimassi, Ixelles (BE)

(73) Assignee: The Procter & Gamble Company, Cincinnati, OH (US)

( * ) Notice: Subject to any disclaimer, the term of this patent is extended or adjusted under 35 U.S.C. 154(b) by 1023 days.

(21) Appl. No.: 11/604,454

(22) Filed: Nov. 27, 2006

(65) Prior Publication Data
US 2007/0129476 A1 Jun. 7, 2007

(30) Foreign Application Priority Data
Dec. 7, 2005 (EP) .................................. 05026705

(51) Int. Cl.
*A61L 9/00* (2006.01)
*A61L 9/04* (2006.01)
(52) U.S. Cl. ..................... 424/76.4; 424/76.1; 424/76.2; 424/76.3; 523/102; 428/905
(58) Field of Classification Search ................. 424/76.1, 424/76.2, 76.3, 76.4; 523/102; 428/905
See application file for complete search history.

(56) References Cited

U.S. PATENT DOCUMENTS

| | | | |
|---|---|---|---|
| 2,168,892 A | 11/1952 | Locks et al. | |
| 3,174,654 A | 3/1965 | Renier | |
| 3,412,907 A | 11/1968 | Faso | |
| 3,876,762 A | 4/1975 | Rabussier et al. | |
| 3,969,280 A | 7/1976 | Sayce et al. | |
| 4,492,644 A | 1/1985 | Matsumoto et al. | |
| 4,515,909 A | 5/1985 | Sawano et al. | |
| 4,552,693 A | 11/1985 | Hussain et al. | |
| 4,618,629 A | 10/1986 | Buchanan | |
| 4,734,278 A | 3/1988 | Pougalan et al. | |
| 4,761,437 A | 8/1988 | Christie | |
| 4,858,831 A | 8/1989 | Spector | |
| 4,865,759 A | 9/1989 | Coyne et al. | |
| 4,904,524 A | 2/1990 | Yoh | |
| 5,411,739 A * | 5/1995 | Jaeger et al. .................. | 424/448 |
| 5,698,166 A | 12/1997 | Vick et al. | |
| 5,861,128 A | 1/1999 | Vick et al. | |
| 6,111,055 A | 8/2000 | Berger et al. | |
| 6,153,210 A | 11/2000 | Roberts et al. | |
| 6,225,520 B1 | 5/2001 | Bauduin et al. | |
| 6,291,371 B1 | 9/2001 | Shefer et al. | |
| 6,375,966 B1 | 4/2002 | Maleeny et al. | |
| 6,875,245 B2 | 4/2005 | Pavlin | |
| 2001/0046510 A1 | 11/2001 | Mullen | |
| 2002/0037385 A1 | 3/2002 | Pignot et al. | |
| 2002/0103086 A1 | 8/2002 | Asrar et al. | |
| 2003/0105183 A1 | 6/2003 | Sharak | |
| 2003/0195272 A1 | 10/2003 | Harwell et al. | |
| 2004/0018278 A1 | 1/2004 | Popplewell et al. | |
| 2004/0018293 A1 | 1/2004 | Popplewell et al. | |
| 2004/0105836 A1 | 6/2004 | Seipel et al. | |
| 2004/0191200 A1 | 9/2004 | Lezer et al. | |
| 2004/0241195 A1 | 12/2004 | Tollens | |
| 2005/0106200 A1 | 5/2005 | Corzani et al. | |
| 2005/0148479 A1 | 7/2005 | Barthel et al. | |
| 2005/0150154 A1 | 7/2005 | Maat | |
| 2005/0202988 A1 | 9/2005 | De Belder et al. | |
| 2005/0272878 A1 | 12/2005 | Corzani et al. | |
| 2006/0099168 A1 | 5/2006 | Corzani et al. | |
| 2009/0324143 A1 * | 12/2009 | Sharp et al. .................. | 383/109 |

FOREIGN PATENT DOCUMENTS

| | | |
|---|---|---|
| CA | 1 341 003 A | 5/2000 |
| DE | 10237066 A1 | 2/2004 |
| EP | 1 153 169 | 2/2004 |
| GB | 1 558 960 A | 1/1980 |
| GB | 2 286 531 A | 8/1995 |
| GB | 2 372 450 A | 8/2002 |
| JP | 59-152151 A2 | 8/1984 |
| JP | 60-147443 A2 | 8/1985 |
| JP | 08-283484 A2 | 10/1996 |
| WO | WO 97/26020 A1 | 7/1997 |
| WO | WO 02/066084 A1 | 8/2002 |
| WO | WO 03/974642 A1 | 9/2003 |

OTHER PUBLICATIONS

Merriam-Webster's Collegiate Dictionary, 10th edition, Merriam-Webster Incorporated: Springfield, Massachusetts, 1993, pp. 311.*
PCT International Search Report, May 25, 2007, 5 pages.

* cited by examiner

*Primary Examiner* — James H. Alstrum-Acevedo
(74) *Attorney, Agent, or Firm* — Kelly L. McDow

(57) ABSTRACT

A polymeric composition comprising a copolymer of ethylene with at least another monomer comprising at least a heteroatom, a tackifier, less than 10% of a compatible plasticizer or blend of plasticizers and a volatile material. The compositions are able to deliver effectively the volatile material incorporated for a long time and also have good adhesion properties on most substrates.

3 Claims, No Drawings

POLYMERIC COMPOSITIONS FOR SUSTAINED RELEASE OF VOLATILE MATERIALS

FIELD OF THE INVENTION

The present invention relates to tackified polymeric compositions which are able to incorporate and sustainedly release volatile materials (e.g. perfumes) based on copolymers of ethylene with at least another monomer comprising at least a heteroatom. The compositions of the present invention can find a variety of applications wherein a prolonged delivery of a volatile material in an environment is desired such as in air freshening devices, deodorants, scented objects, insecticides etc. or when there is a need to create a long lasting perfumed headspace in a package.

BACKGROUND OF THE INVENTION

Polymeric compositions which are able to absorb and release volatile ingredients are well known in the art, in particular concerning perfume delivery.

GB1558960 from Nagae, describes a perfume emitting PVC film to be used in umbrellas.

U.S. Pat. No. 4,618,629 from T. Burnett & Co, Inc describes fragrance-emitting polyurethane foams which have a particulate fragrance-carrying resin incorporated in them. The resin can be selected from a list of polymers (polyolefins, polyester, PVC and similar, polyamides, cellulose polymers).

A common use of polymeric compositions for perfume delivery comprises for example air freshening devices. These are typically in the form of aqueous gels usually obtained from crosslinked polysaccharide polymers (starches, alginates or CMC) such as those described in GB2286531 from Kelco, U.S. Pat. No. 3,969,280 from Johnson & Johnson.

While these and other documents claim to provide long lasting delivery of volatile materials, they are still far from being fully satisfactory for a number of reasons.

Firstly, these polymeric compositions can normally incorporate and release a very limited amount of volatile material, in most cases not exceeding 10% of the total weight of the compositions.

Secondly these polymeric compositions are not able to release uniformly different components of the volatile material which have different volatilities. Given, for example, a perfume which can have more than 10 different components, the more volatile components will be released first and after some time only the less volatile notes would be perceptible, therefore the full perfume character would never be perceived by the user. Actually, the above mentioned polymeric compositions are commonly used to deliver simple perfumes, typically consisting of a single volatile substance such as citronellol as they are simply not capable to consistently deliver a more sophisticated perfume as is increasingly desired by the modern perfume industry.

Thirdly pure polymeric materials are difficult to transform and generally require high temperatures to be molded. Therefore whenever a volatile material is introduced in the melt, a large amount of said material is lost due to the high temperature.

The first and second problems have been partially addressed by Firmenich in U.S. Pat. No. 4,734,278 which describes shaped bodies of block polyether-amide based resins (e.g. Pebax™) that provide sustained release of volatile actives (perfumes, deodorants, insecticides etc). An improvement has been obtained by Atochem that in WO 9726020A1 describes improved fragrant resins made of Pebax™ plus a complex perfume (i.e. more than 5 components). Such resins are able to deliver a complex perfume with a reduced separation of the volatile ingredients over time.

The third problem has been only partially solved by the use of plasticizers which, as it is well known to those skilled in the art, allow the reduction of the processing temperature of polymeric mixtures. This solution has been applied e.g. by Avon in U.S. Pat. No. 4,552,693 which describes transparent fragrance-emitting articles obtained from compositions comprising a thermoplastic polyamide resin, a plasticizer/solvent system comprising a sulfonamide plasticizer, and a fragrance. The advantage of using a plasticizer in these compositions is the possibility of processing said compositions (molding, extruding, filming) at relatively low temperatures, as it is known for so called hot melt compositions.

Further improved compositions have been described in European Patent Appl. EP 1,153,169 assigned to Procter & Gamble Company which describes a polymeric material which is able to incorporate and sustainedly release volatile materials which are composed by several ingredients of different volatility for a long time and without separation of said ingredients during the release, and is also capable of being easily processed and formed into an article, preferably with hot melt techniques.

Another problem which is relevant when polymeric compositions capable of delivering a volatile material are to be incorporated into a product is their adhesion on substrates when applied e.g. in the molten state. In many cases, in fact, said polymeric compositions need to be applied on a substrate (e.g. the internal surface of a package, or a support surface on an air freshener device) on a high speed process line. In this situation it is clearly desirable not only that the polymeric compositions can be applied as a hot melt but also that said polymeric compositions have sufficient adhesion to remain in the desired point of application without the need for an additional source of adhesion such as an adhesive strip, or an additional hot melt glue to be applied onto the substrate before said polymeric composition in order to fix it on that. Prior art materials have to compromise between capability in delivering different volatile materials and effective adhesion properties in the molten state.

Prior art polymeric compositions are often based on specific pure polymers like polyether-polyamide block copolymers, pure polyamide polymers or pure EVA polymers. As a consequence the choice of the volatile material was limited to those ingredients which were soluble or compatible with that specific polymer.

In U.S. Pat. No. 5,861,128 a composition comprising an EVA polymer and a plasticizer is described. However the plasticizers suggested for use with EVA are only hydrocarbons (e.g. polybutene) and therefore the resulting compositions are able to incorporate only a limited number of perfume materials due to their low polarity.

U.S. Pat. No. 4,515,909 describes resinous compositions for the release of fragrant substances which are based on EVA and also contain up to 10% of the weight of the polymer of a perfume diffusing agent which can also be regarded as a plasticizer, but the low level at which it is used does not provide the composition with adhesion properties, in fact compositions described here are used in molds and are not adhesive.

Polymeric compositions which are able to incorporate and sustainedly release different volatile materials and which are also capable of being easily processed, typically as a hot melt, and which have a good adhesion on most polymeric and cellulosic substrates are described in our co-pending European Patent Appl. 04013513.

The present invention describes alternative compositions providing the same advantages as those described in European Patent Appl. 04013513, and having in addition improved adhesive properties.

The compositions of the present invention have in fact very good handling of high amounts of different volatile materials (high wt % storage, long sustained delivery times) combined with further improved adhesive properties which allow even easier application where needed for incorporation in a product in an industrial manufacturing process.

SUMMARY OF THE INVENTION

The present invention relates to a polymeric composition comprising:
a) a copolymer of ethylene with at least another monomer comprising at least a heteroatom,
b) a tackifier,
c) up to 10% by weight of the total weight of the composition of a compatible plasticizer or blend of plasticizers,
d) a volatile material.

DETAILED DESCRIPTION OF THE INVENTION

It was surprisingly found that a polymeric composition comprising a) a copolymer of ethylene with at least another monomer comprising at least a heteroatom, b) a tackifier, c) less than 10% by weight of the total weight of the composition of a compatible plasticizer or blend of plasticizers, d) a volatile material, has the ability of releasing said volatile material for a long time in a sustained manner, i.e. with a constant release rate and for a long period of time. Such compositions can be applied as hot-melt adhesives and also have surprisingly good adhesion on most substrates (plastic films, foams, cardboard and the like).

Another very important benefit provided by the polymeric compositions of the present invention is the possibility to introduce a wide range of volatile materials.

It has been surprisingly found that polymeric compositions according to the present invention, can incorporate and effectively deliver a large number of volatile materials in a broad polarity range, while also having a good adhesion in the molten state on most substrates.

Differently from prior art, the compositions of the present invention are much more flexible in terms of the compositions of the volatile material which can be incorporated and then delivered, since the formulator can choose the copolymer among all copolymers of ethylene with at least another monomer comprising at least a heteroatom, additionally the tackifier can be selected among a wide range of suitable materials of different polarity and behavior. Also, a number of additives can be optionally introduced into the formulation as explained in detail below. Such a formulation flexibility for the tackified polymeric matrix (copolymer, tackifier, up to 10% by weight of the total weight of the composition of a plasticizer, optionally other polymers or additives) allows the tuning of its polarity characteristics very precisely. This makes it possible to maximize the compatibility with any volatile material which could be introduced in the tackified polymeric matrix thus obtaining a polymeric composition according to the present invention. Without being bound to any theory, it is believed that a certain polarity match between the tackified polymeric matrix and the volatile material is required to provide good incorporation and sustained delivery of the volatile material.

Hence the copolymer and the tackifier of the polymeric compositions of the present invention can be preferably selected such that the polarity of the tackified polymeric matrix substantially matches the polarity of the volatile material, wherein the polarities can be evaluated with one of the methods known in the art.

Conventionally, polymeric compositions which can be used as hot melts comprise significant amount of plasticizers. Surprisingly compositions of the present invention, even if they have a low content in plasticizer, can be formulated as hot melts which have a very low application temperature, typically below 100° C. and in some cases if desired can be formulated to have an application temperature below 70° C. We believe this is due to the particular selection of tackifier and to the particular combination of ingredients of the compositions of the present invention. This is a particularly desirable property for materials used to incorporate volatile substances as the higher is the processing temperature the bigger is the risk of losing by evaporation significant amounts of the volatile material incorporated during the manufacturing of the composition.

The first essential component of the polymeric composition of the present invention is a copolymer of ethylene with at least another monomer comprising at least a heteroatom.

All copolymers of ethylene with at least another monomer comprising at least a heteroatom are suitable for the present invention.

The term "monomer comprising at least a heteroatom" includes all those monomers which comprise at least a C—X linkage in the molecule wherein X is not C or H. Said C—X linkage is preferably a polar linkage. Preferably the carbon atom is linked to an N, S, F, Cl or O atom. More preferably said polar linkage is part of a carbonyl group and, more preferably, of an ester group. Preferred monomers comprising at least a heteroatom for the present invention are vinyl acetate, vinyl alcohol, methyl acrylate, ethyl acrylate, butyl acrylate, acrylic acid and salts formed therefrom, methacrylic acid and salts formed therefrom, maleic anhydride, glycidyl methacrylate and carbon monoxide.

Suitable copolymers for the present invention can be both block and non-block copolymers, grafted copolymers, copolymers with side chains, or crosslinks and copolymers where ethylene monomers are randomly copolymerized with monomers comprising at least a heteroatom.

Among preferred copolymers of ethylene which are suitable for the present invention are, for example, ethylene-vinyl ester copolymers, ethylene-acrylic ester copolymers, ethylene-methacrylic ester copolymers, ethylene-acrylic acid copolymers and their salts, ethylene-methacrylic acid copolymers and their salts, ethylene-vinyl ester-acrylic acid copolymers, ethylene-vinyl ester-methacrylic acid copolymers, ethylene-vinyl ester-maleic anhydride copolymers, ethylene-acrylic ester-maleic anhydride copolymers, ethylene-vinyl ester-glycidyl methacrylate copolymers, ethylene-acrylic ester-glycidyl methacrylate copolymers, ethylene-maleic anhydride copolymers, ethylene-glycidyl methacrylate copolymers The monomer comprising at least a heteroatom in the copolymers suitable for the present invention preferably represents from 10% to 90% of the total weight of the copolymer, more preferably at least 14% most preferably at least 18%.

Particularly preferred copolymers for the present invention are ethylene-vinyl acetate copolymers such as those sold under the trade names Elvax™ by Dupont, Evathane™ by Atofina, Escorene™ by Exxon and Levapren™ and Levamelt™ by Bayer and ethylene-acrylic ester copolymers such as those sold under the trade name Lotryl™ by Atofina.

The second essential component of the present invention is a tackifier. Tackifiers otherwise called "tackifier resins" or "tackifying resins" are materials which are commonly sold as such and are used in hot melt adhesives in order to improve the adhesive properties of the material. A good tackifier is compatible with the copolymer, has a low molecular weight with respect to the copolymer and has a Tg which is higher than that of the copolymer, so that when they are introduced into the polymeric composition, the Tg of said composition is increased. Preferred tackifiers for use herein are thermoplastic materials, stable to at least 200° C., amorphous glassy at room temperature, and having a Tg higher than 50° C., preferably comprised between 80 and 125° C. Preferably tackifiers for use herein have a molecular weight comprised between 500 and 2000 Daltons.

Tackifiers are in general organic chemicals with polycyclic structure, preferred are those which are not aliphatic hydrocarbons. More preferred are aromatic tackifiers and tackifiers which comprise oxygen atoms in the molecule. Most preferred tackifiers are rosin and its derivatives which are solid at room temperature.

The third essential component of the present invention is a volatile material which is incorporated and then sustainedly delivered by the compositions of the present invention.

A material is generally defined as volatile if it generates vapors under usage conditions, preferably its vapor pressure is at least 0.1 mmHg at room temperature.

Volatile materials which can be used in the present invention are for example flavors, deodorants, insecticides, pheromones, aromas, repelling agents and most advantageously, perfumes.

The benefits provided by the present invention are particularly relevant when the volatile material is a perfume. Perfumes are typically composed of many components of different volatility. The present invention, avoiding separation of the components based on their different volatility, allows the sustained delivery of the full perfume bouquet for a long time. In a preferred embodiment of the present invention the volatile material is a perfume which is preferably composed by a plurality of components, more preferably by more than 5 components.

As used herein the term perfume means any odoriferous material. In general, such materials are characterised by a vapour pressure less than the atmospheric pressure at room temperatures. The perfumes employed herein will most often be liquid at room temperatures, but also can be solid such as the various camphoraceous perfumes known in the art. A wide variety of chemicals are known for perfumery uses, including materials such as aldehydes, ketones, esters, alcohols, terpenes and the like. Naturally occurring plant and animal oils and exudates comprising complex mixtures of various chemical components are known for use as perfumes, and such materials can be used herein. The perfumes herein can be relatively simple in their composition or can comprise highly sophisticated, complex mixtures of natural and synthetic chemical components, all chosen to provide any desired odor.

Typical perfumes which can be used in the present invention comprise, for example, woody/earthy bases containing exotic materials such as sandalwood oil, civet, patchouli oil and the like. Other suitable perfumes are for example light, floral fragrances, e.g., rose extract, violet extract and the like. Perfumes can be formulated to provide desirable fruity odours, e.g., lime, lemon, orange and the like.

In short, any chemically compatible material which emanates a pleasant or otherwise desirable odour can be used as a perfume in the present invention.

Perfume materials are described more fully in S. Arctander, Perfume Flavors and Chemicals. Vols. I and II. Aurthor, Montclair, N.J., and the Merck Index, 8th Edition, Merck & Co., Inc. Rahway, N.J.

Preferably the volatile material of the present invention is introduced in the polymeric composition in a form which allows the chemicals which constitute said volatile material to be chemically dissolved in the tackified polymeric matrix. In particular encapsulated volatile materials and chemicals which comprise volatile species covalently bonded to a non volatile one (e.g. pro-perfumes), are not recommended and preferably excluded for use herein as volatile materials according to the present invention. Without being bound to any theory, it is believed that the advantageous properties of the polymeric compositions of the present invention can be seen when the volatile material is solubilized in the tackified polymeric matrix, as the volatile material release is linked to molecular level interaction between the volatile material and the tackified polymer matrix. Therefore systems such as encapsulation, which prevent the volatile material from mixing at molecular level with the polymeric matrix, are not preferred for use as volatile materials in the present invention, and are preferably excluded.

A compatible plasticizer or blend of plasticizers can be optionally present in the compositions according to the present invention up to a concentration of 10% by weight of the total weight of the composition. As known to the skilled man, the term "compatible" indicates a material which can be stably formulated in the matrix without forming a separated phase. The term "plasticizer", as known to those skilled in the art of thermoplastic polymeric materials, defines a class of materials which are introduced into polymeric materials to make them softer and more flexible. More specifically plasticizers cause an increase in the flexibility and workability, brought about by a decrease in the glass-transition temperature, Tg, of the polymer.

As already mentioned above, the different polarity of the different compatible plasticisers (measurable with any method known to those skilled in the art, for example water/octanol partition coefficient) can be used to tune the polarity of the polymeric matrix in order to provide a better match with the polarity of the volatile material.

Preferably the polymeric composition of the present invention comprises from 5% to 75%, more preferably from 10% to 50% by weight of the polymeric composition, of the copolymer of ethylene with at least another monomer comprising at least a heteroatom; from 10% to 60%, preferably from 15% to 40% by weight of the copolymer, of the compatible tackifier, up to 10% by weight of the total weight of the composition of a plasticizer, and more than 10% preferably more than 20%, more preferably more than 30% by weight of the polymeric composition of a volatile material; the volatile material is preferably comprised up to a maximum percentage of 90% by weight of the polymeric composition.

The polymeric compositions of the present invention may in addition comprise additional optional components to further improve the processability of the compositions and also the mechanical characteristics as well as other characteristics as tackiness, resistance to ageing by light, oxygen and heat, visual appearance etc., of the objects formed from such polymeric compositions.

Such optional components may include other copolymers that can be included in the formulations to improve their properties for example to increase adhesion or compatibility with substrates. To this purpose preferred optional copolymers are copolymers of styrene and at least one other vinyl or acrylic monomer, copolymers of poly(vinyl alcohol), polyamides, polyether amide copolymers, polyester amide copolymers, polyesters, polyether ester copolymers, polyurethanes, polyethers, poly(2-ethyl-2-oxazoline), copolymers of poly (vinyl pyrrolidone), polyacrylates, copolymers of polyvinyl ethers), etc.

The polymeric compositions of the present invention preferably are thermoplastic polymeric compositions. These can be manufactured by using any known process for manufacturing thermoplastic polymeric compositions and will typically comprise the steps of melting the polymer and then homogeneously blending the tackifier, the plasticizer if present and the volatile material to form a homogeneous mass that is then cooled to obtain the polymeric composition according to the present invention. Among thermoplastic compositions preferred are those which have low melt temperature and viscosity and therefore are processable as hot melts. In these systems the loss of volatile material upon blending, as well as upon subsequent application in the molten state is minimized.

Further optional ingredients such as other polymers or copolymers, fillers, crosslinkers, pigments, dyes, antioxidants and other stabilizers, etc can also be added to provide desired properties to the composition.

The polymeric compositions of the present invention may also be prepared using a polymer solution, either as an intermediate or final step. Preparations of this type are well known to those skilled in the art and typically will comprise the steps of dissolving the selected polymer, tackifier, optionally plasticizer and volatile material in an effective solvent, and heating if necessary to prepare a solution or a gel. The solvent can then be eliminated by evaporation.

Alternatively, the polymeric compositions of the present invention can be prepared in the form of an aqueous emulsion or dispersion.

The techniques for obtaining aqueous emulsions or dispersions of polymers are well known to the skilled man. For example, the selected polymer, tackifier, optional plasticiser and volatile material can be blended together as a thermoplastic material. The resulting melt can then be dispersed in water, preferably at a temperature above its melting point, by mixing. Surfactant and/or stabilizing systems known to those skilled in the art can be employed to stabilize the resultant emulsion or dispersion.

Alternatively, a preformed aqueous polymeric dispersion or emulsion can be blended with the selected tackifier, optional plasticiser and volatile material. This can be done by adding the ingredients directly to the polymeric dispersion or emulsion, or e.g. by forming an aqueous dispersion of the perfume tackifier and optional plasticiser and blending this with the polymeric dispersion or emulsion. Both procedures result in the formation of an aqueous dispersion of a polymeric composition according to the present invention. Water can be then eliminated by evaporation.

Alternatively, the copolymer can be directly formed in a water dispersion in the presence of the tackifier, the optional plasticiser and/or of the volatile material. This process can involve the solution or dispersion of monomers or prepolymers in water containing the dispersed volatile material and/or tackifier and optional plasticiser. The polymerization can then be initiated to form the polymeric dispersion. If required, the volatile material, tackifier or optional plasticiser can be alternatively added subsequently to produce a dispersed polymeric composition according to the present invention.

The polymeric compositions of the present invention due to their rheology and to their adhesion properties are particularly useful to be applied in the molten state onto a selected substrate, and directly adhered thereto. For example they can be applied to the inner surface of a container in a suitable position in order to suitably modify the headspace in the closed container by releasing the volatile material, for example a perfume in order to create a perfumed headspace. Such application can be easily achieved during the manufacturing of the container. In this embodiment, the polymeric composition of the present invention is applied in a conventional hot melt delivery system. Theses systems typically include a melting unit, which maintains the hot melt at the temperature required to have a processable viscosity. The melting unit typically contains a pumping system capable of pumping the hot melt through a hose until it reaches the glue gun, or nozzle. The nozzle can have different geometries according to the desired application form of the glue (coatings, stripes, beads etc). In a typical embodiment, a slot nozzle can be used as the glue gun.

Polymeric compositions according to the present invention may have different applications whenever the release of a volatile material is desired. For example they can be used in air-freshening devices (room-fresheners, car fresheners, toilet rim-blocks etc.), perfumed headspace delivery in packages such as bottles, boxes, bags, etc., cleaning/drying systems (tumble dryers, dishwashers, dry cleaning systems etc.), laundry detergents, fabric conditioners, home care products, personal care products (deodorants, anti-perspirants, shampoos, conditioners, cosmetics, skin moisturizers, makeups etc.), fine fragrances, scented coatings, films, laminates, hygienic articles (fem-care pads, panty liners, diapers, shoe insoles, etc.), scented inks, scented three dimensional objects, disinfectants delivery, insecticides delivery, insect repellants delivery, flavor delivery etc.

The compositions of the present invention will be illustrated with the following examples:

EXAMPLES

Example 1

19.75 parts of Elvax® 250, a poly(ethylene-co-vinyl acetate) with a vinyl acetate content of 28 wt % and a melt flow index of 25 g/10 min (ASTM D1238), available from Dupont, 19.75 parts of Elvax® 40W, a poly(ethylene-co-vinyl acetate) with a vinyl acetate content of 40 wt % and a melt flow index of 52 g/10 min (ASTM D1238), available from Dupont, 20 parts of Foral™ 85-E, a rosin ester tackifier available from Eastman Chemical and 0.5 parts of Irganox™ B225, an antioxidant available from Ciba Geigy (Switzerland) were added to a sigma blade mixer and heated to a temperature of about 120° C. The ingredients were mixed until a homogeneous mass was obtained. The temperature was then reduced to a point where the mixture was still molten, (about 80° C.). 40 parts of Eugenol, a perfume material available from Sigma Aldrich, were added to the tackified polymer mixture. The ingredients were mixed until a homogeneous mixture was obtained, and the resultant material was then removed from the mixer, formed as a perfuming block and cooled to room temperature.

Example 2

19.75 parts of Elvax® 250, a poly(ethylene-co-vinyl acetate) with a vinyl acetate content of 28 wt % and a melt flow index of 25 g/10 min (ASTM D1238), available from Dupont, 14.75 parts of Elvax® 40W, a poly(ethylene-co-vinyl acetate) with a vinyl acetate content of 40 wt % and a melt flow index of 52 g/10 min (ASTM D1238), available from Dupont, 15 parts of Foral™ 85-E, a rosin ester tackifier available from Eastman Chemical and 0.5 parts of Irganox™ B225, an antioxidant available from Ciba Geigy (Switzerland) were added to a sigma blade mixer and heated to a temperature of about 120° C. The ingredients were mixed until a homogeneous mass was obtained. The temperature was then reduced to a point where the mixture was still molten, (about 80° C.). 50 parts of Eugenol, a perfume material available from Sigma Aldrich was added to the tackified polymer mixture. The ingredients were mixed until a homogeneous mixture was obtained, and the resultant material was then removed from the mixer, formed as a perfuming block and cooled to room temperature.

Example 3

24.5 parts of Elvax® 40W, a poly(ethylene-co-vinyl acetate) with a vinyl acetate content of 40% and a melt flow index of 52 g/10 min, available from Dupont, 25 parts of Foral™ 85-E, a rosin ester tackifier available from Eastman Chemical and 0.5 parts of Irganox™ B225, an antioxidant available from Ciba Geigy (Switzerland) were added to a sigma blade mixer and heated to a temperature of about 120° C. The ingredients were mixed until a homogeneous mass was obtained. The temperature was then reduced to a point where the mixture was still molten, (about 80° C.). 50 parts of Eugenol, a perfume material available from Sigma Aldrich, and this blend was added to the tackified polymer mixture. The ingredients were mixed until a homogeneous mixture was obtained, and the resultant material was then removed from the mixer, formed as a perfuming block and cooled to room temperature.

The polymeric compositions of the examples can be easily processed an applied as hot melts, as it is evident from the respective low melting points (between about 60 and about 80° C.).

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A homogeneous polymeric hot melt adhesive composition having a melting point of between about 60° C. to about 80° C. comprising:
    a) a copolymer of ethylene with vinyl acetate
    b) a tackifier which is a rosin that is solid at room temperature, and
    c) a perfume at a level more than 20% of the total weight of the composition, said composition containing less than 10% by weight of plasticizer.

2. A polymeric composition according to claim 1 wherein the copolymer is from 5% to 75% by weight of the polymeric composition, the tackifier is from 10% to 60% by weight of the copolymer and the perfume is more than 30% of the total weight of the composition.

3. A polymeric composition according to claim 1 wherein the tackifier has a Tg higher than 50° C.

* * * * *